United States Patent [19]

Watanabe et al.

[11] Patent Number: 5,412,013
[45] Date of Patent: May 2, 1995

[54] POLYAMIDE RESIN COMPOSITION

[75] Inventors: Noriyoshi Watanabe; Kiyoshi Morishige; Hajime Inoue, all of Hiratsuka, Japan

[73] Assignee: Mitsubishi Gas Chemical Company, Inc., Tokyo, Japan

[21] Appl. No.: 93,874

[22] Filed: Jul. 20, 1993

[30] Foreign Application Priority Data

Jul. 20, 1992 [JP] Japan ............... 4-192088

[51] Int. Cl.6 .................................... C08K 3/00
[52] U.S. Cl. .......................... 524/413; 524/407; 524/424; 524/437; 524/434; 524/449; 525/432
[58] Field of Search ............... 525/432; 524/413, 431, 524/434, 449, 401, 424

[56] References Cited

U.S. PATENT DOCUMENTS

| | | | |
|---|---|---|---|
| 2,845,962 | 8/1958 | Bulgin | 139/420 |
| 2,868,757 | 1/1959 | Symons | 260/37 |
| 3,558,553 | 1/1971 | Hayes | 260/45.75 |
| 3,591,565 | 7/1971 | Hansen | 524/401 |
| 3,968,071 | 7/1976 | Miyamot | 524/494 |
| 4,098,860 | 7/1978 | Etou et al. | 264/171 |
| 4,612,339 | 9/1986 | Giroud-Abel | 524/84 |
| 4,702,859 | 10/1987 | Shimizu et al. | 524/495 X |
| 4,980,407 | 12/1990 | Okumoto et al. | 524/449 |
| 5,147,944 | 9/1992 | Takeda | 525/432 |
| 5,168,108 | 12/1992 | Chacko et al. | 525/432 X |
| 5,248,738 | 9/1993 | Sato et al. | 525/432 |
| 5,252,661 | 10/1993 | Reimann et al. | 525/432 X |

FOREIGN PATENT DOCUMENTS

| | | |
|---|---|---|
| 0157756 | 10/1985 | European Pat. Off. . |
| 2596567 | 10/1987 | European Pat. Off. . |
| 2300782 | 9/1976 | France . |
| 0272503 | 6/1988 | Japan . |
| 2120361 | 5/1990 | Japan . |
| 484963 | 1/1971 | Switzerland . |
| 1200454 | 7/1970 | United Kingdom . |

*Primary Examiner*—Judy M. Reddick
*Attorney, Agent, or Firm*—Wenderoth, Lind & Ponack

[57] ABSTRACT

There is disclosed a polyamide resin composition comprising (A) 100 parts by weight of a polyamide (a) composed mainly of a xylylenediamine component and an $\alpha,\omega$-straight chain asphaltic dibasic acid component, or a combination of the polyamide (a) and polyamide 66, (B) 1 to 15 parts by weight of polyamide 12, (C) 0.01 to 5 parts by weight (in terms of copper) of a copper compound, (D) 1 to 15 parts by weight of carbon black, and (E) an alkali metal halide of such an amount that the number of halogen atoms of the alkali metal halide is 0.3 to 4 per one copper atom of the above copper compound. Said polyamide resin composition has an excellent weather resistance, moldability, and mechanical properties, and can be injection-molded.

10 Claims, No Drawings

POLYAMIDE RESIN COMPOSITION

BACKGROUND OF THE INVENTION

1. Field of the Invention

The present invention relates to a polyamide resin composition. More particularly, the present invention relates to a polyamide resin composition which is excellent in weather resistance, moldability and mechanical properties, and which can be injection-molded.

2. Prior Art

Polyamide resins have good mechanical properties, moldability and chemical resistance and are in wide use as automobile parts, machine parts, building materials, etc. Polyamide resins, however, are very susceptible to oxidative deterioration and, when deteriorated by oxidation, reduce the polymerization degree. This reduction in polymerization degree invites undesirable phenomena such as reduction in mechanical properties, occurrence of surface cracks, coloring and the like. The oxidative deterioration is accelerated by heat or light and, therefore, use of polyamide resin in outdoor exposure is restricted.

In order to prevent the above oxidative deterioration, i.e. to improve the weather resistance of polyamide resin, addition of various stabilizers to polyamide resin is disclosed in Japanese Patent Application Kokai (Laid-Open) No. 93652/1973 and Japanese Patent Publication No. 29823/1989.

That is, Japanese Patent Application Kokai (Laid-Open) No. 93652/1973 discloses a polyamide resin composition having excellent heat resistance and light resistance, obtained by adding to a polyamide a metal complex of a tetraalkylammonium iodide represented by the following general formula

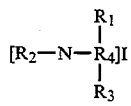

wherein $R_1$, $R_2$, $R_3$ and $R_4$ are each a hydrogen atom or an alkyl group having 1 to 5 carbon atoms and at least one of $R_1$ to $R_4$ is an alkyl group.

Japanese Patent Publication No. 29823/1989 discloses a reinforced polyamide molding material comprising (A) 0.01 to 5% by weight of carbon black, (B) 1 to 70% by weight of a glass fiber, and (C) 25 to 98.09% by weight of a polyamide per 100% by weight of the total amount of the components (A), (B) and (C), wherein the particle size of the carbon black is such that the maximum particle diameter is 20 μm or less and the volume average particle diameter of those particles having diameters of 1 μm or more is 5 μm or less.

The improvement of weather resistance by the above composition or material, however, is not satisfactory, and further improvement is desired.

SUMMARY OF THE INVENTION

An object of the present invention is to provide a polyamide resin composition which can be used in injection molding.

Another object of the present invention is to provide a polyamide resin composition having excellent weather resistance.

A further object of the present invention is to provide a polyamide resin composition having excellent weather resistance and a balance in moldability and mechanical properties.

According to the present invention there is provided a polyamide resin composition comprising (A) 100 parts by weight of a polyamide (a) composed mainly of a xylylenediamine component and an α,ω-straight chain aliphatic dibasic acid component, or a combination of the polyamide (a) and polyamide 66, (B) 1 to 15 parts by weight of polyamide 12, (C) 0.01 to 5 parts by weight (in terms of copper) of a copper compound, (D) 1 to 15 parts by weight of carbon black, and (E) an alkali metal halide of such an amount that the number of halogen atoms of the alkali metal halide is 0.3 to 4 per one copper atom of the above copper compound.

The above objects can be achieved by this polyamide resin composition.

DETAILED DESCRIPTION OF THE INVENTION

The polyamide resin composition of the present invention comprises a polyamide (a) composed mainly of a xylylenediamine component and an α,ω-straight chain aliphatic dibasic acid component, or a combination of the polyamide (a) and polyamide 66 [said polyamide (a) or said combination is hereinafter referred to as "resin component" sometimes].

The xylylenediamine component constituting the polyamide (a) includes m-xylylenediamine and p-xylylenediamine. The polyamide (a) may contain, besides the xylylenediamine component, an aliphatic diamine component or an aromatic diamine component in an amount of 30% by weight or less, preferably 20% by weight or less, based on the total diamine components. Preferably, m-xylylenediamine component is contained in an amount of 60% by weight or more, particularly 70% by weight or more, based on the total diamine components.

The α,ω-straight chain aliphatic dibasic acid component preferably has 6 to 12 carbon atoms, and examples thereof include adipic acid, sebacic acid, suberic acid, dodecanedioic acid and eicosanoic acid. Of these, adipic acid is preferable in view of the moldability and mechanical properties required for the polyamide resin composition of the present invention.

The polyamide (a) may contain a dibasic acid component other than the α,ω-straight chain aliphatic dibasic acid component, such as aromatic dibasic acid, chain aliphatic dibasic acid or the like in an amount of 30% by weight or less, preferably 20% by weight or less, based on the total amount of the dibasic components.

The polyamide (a) used in the present invention preferably has a relative viscosity of 1.8 to 3.0, particularly 2.0 to 2.4, as measured at 25° C. for a solution of 1 g of the polyamide (a) dissolved in 100 ml of 98% sulfuric acid.

Such a polyamide (a) is a substance per se known, and can be easily produced by conducting polycondensation by a known process using m-xylylenediamine and an α,ω-straight chain aliphatic dibasic acid as main starting materials.

Polyamide 66 is a known polyamide composed mainly of hexamethylenediamine and adipic acid.

When the polyamide (a) and polyamide 66 are used in combination, the polyamide resin composition of the present invention can have improved moldability and the cycle time of injection molding can be shortened, as compared with when the polyamide (a) alone is used.

When the polyamide (a) and polyamide 66 are used in combination, the proportion of polyamide 66 is preferably 40% by weight or less, more preferably 1 to 40% by weight, particularly preferably 3 to 40% by weight, in view of the mechanical strengths and low water absorption required for the present polyamide resin composition.

The polyamide resin composition of the present invention comprises polyamide 12, a copper compound, carbon black and an alkali metal halide for the purpose of improving weather resistance.

Polyamide 12 is a substance per se known, and preferably has a melt flow rate of 20 to 250 g/10 min, particularly 30 to 100 g/10 min. as measured in accordance with ASTM D 1238 under the conditions of the load of 10 kg at a temperature of 275° C. When the melt flow rate of polyamide 12 is in the above range, the resulting polyamide resin composition exhibits good weather resistance and excellent mechanical strengths.

Polyamide 12 is used preferably in an amount of 1 to 15 parts by weight, particularly 5 to 10 parts by weight per 100 parts by weight of the resin component. When the amount of polyamide 12 is in the above range, the polyamide resin composition of the present invention has improved weather resistance and appropriate levels of mechanical properties.

The copper compound is selected from copper halides such as copper chloride, copper bromide, copper fluoride and copper iodide; copper salts of carboxylic acids having 2 to 18 carbon atoms, such as copper acetate, copper naphthenate, copper caprate, copper laurate and copper stearate; copper thiocyanate; copper nitrate; copper acetylacetonate; copper (I) oxide; and copper (II) oxide. Among these compounds, copper halides, copper (I) oxide and copper (II) oxide are preferably used. The above compounds can be used singly or in combination.

The amount of the copper compound used is preferably at least 0.01 part by weight, more preferably 0.01 to 5 parts by weight, particularly preferably 0.01 to 1.5 parts by weight, in terms of copper, per 100 parts by weight of the resin component, for improving weather resistance of the polyamide resin composition.

The alkali metal halide includes a fluoride, bromide or iodide of lithium, sodium or potassium. Of them, potassium iodide is preferable. They can be used singly or in combination. The use of such an alkali metal halide improves the dispersion of the copper compound in the polyamide resin composition and consequently, the weather resistance of the composition is improved.

The alkali metal halide is used preferably in such an amount that the number of halogen atoms of the alkali metal halide is 0.3 to 4, particularly 0.4 to 2.5 per one copper atom of the copper compound.

The carbon black used in the present invention preferably has an average particle diameter of 17 to 27 $\mu$m, particularly 19 to 25 $\mu$m for the maintenance of good dispersion in the composition, and further preferably, it has an oil absorption of 50 to 100 cc/100 g, particularly 53 to 75 cc/100 g. The above oil absorption is a value obtained by measurement described in JIS K 6221 using dibutyl phthalate.

Carbon black is used in an amount of 1 to 15 parts by weight, preferably 3 to 5 parts by weight per 100 parts by weight of the resin components for improvement of weather resistance of the polyamide resin composition and the maintenance of appropriate levels of mechanical properties of the composition.

The polyamide resin composition of the present invention may comprise at least one plastics or elastomer selected from polyethylene terephthalate, polybutylene terephthalate, polycarbonate, polyphenylene ether, polyphenylene sulfide, AS resin, ABS resin, polyolefins, ethylene-propylene rubber, etc. in such an amount that the objects of the present invention are not impaired. It is desirable that the amount of the plastics or elastomer added is 15 parts by weight, particularly 10 parts by weight at the most per 100 parts by weight of the resin component.

The polyamide resin composition of the present invention may further comprise, as required, a reinforcing fiber material such as glass fiber, carbon fiber or the like for improvement of the mechanical strengths.

The amount of the reinforcing fiber material used is preferably 30 to 140 parts by weight per 100 parts by weight of the resin component.

The polyamide resin composition of the present invention may further comprise, as required, a filler such as mica or the like for improvement of the stiffness.

The amount of the filler used is preferably 20 to 80 parts by weight per 100 parts by weight of the resin component.

The reinforcing fiber material and the filler may be used singly or in combination.

The polyamide resin composition of the present invention may further comprise, as required, additives such as a nucleating agent, a plasticizer, a mold-release agent, an antistatic agent, a flame retardant, a lubricant and a pigment.

The polyamide resin composition of the present invention can be generally produced by melt-kneading components using an extruder, at a temperature higher, by 5° to 50° C., than the melting point or the flow-starting temperature of polyamide (a), followed by pelletization.

The polyamide resin composition of the present invention can be molded, by, for example, injection molding, into automobile exterior trim parts and building materials usable in an uncoated state, for example, automobile door mirror stay, fashion rail, door handle and handrail parts.

The present invention is hereinafter described in more detail by way of Examples.

The test pieces prepared in Examples and Comparative Examples were measured for the following test items by the following test methods.

(1) Mechanical Properties

Tensile strength: measured by ASTM D 688.
Tensile modulus: measured by ASTM D 688.
Flexural strength: measured by ASTM D 790.
Flexura modulus: measured by ASTM D 790.

(2) Color Tone

The L value and color tone change of a test piece subjected to an exposure test were measured using a color difference meter (Model: Z-Σ80 manufactured by Nihon Denshoku Kogyo K.K.).

(3) Occurrence of Surface Cracks

The occurrence of surface cracks of a test piece that was subjected to an exposure test was observed using a polarization microscope (model: OPTIPHOT-POL manufactured by NIPPON KOGAKU K.K.).

The following rating standards were employed in Tables 1 and 2.
O: No surface cracks were observed.
X: Surface cracks were observed.

(4) Surface Gloss

The change of surface gloss of a test piece subjected to an exposure test was rated visually. The following rating standards were employed in Tables 1 and 2.
O: The color tone and gloss after exposure were nearly the same as before exposure.
Δ: The color tone and gloss after exposure were slightly inferior to those before exposure.
X: The color tone and gloss after exposure were inferior to those before exposure.

EXAMPLE 1

The following components were mixed with a tumbler to obtain a mixture.

90 parts by weight of a poly(m-xyleneadlpamide) (hereinafter referred to as "MX nylon") manufactured by Mitsubishi Gas Chemical Company, Inc. having a relative viscosity as measured at 25° C. for a solution of 1 g of sald polymer dissolved in 100 ml of 98% sulfuric acid (said relative viscosity is hereinafter referred to as "relative viscosity"), of 2.14.

- 5 parts by weight of polyamide 66 of pellet shape having a relative viscosity of 2.25.
- 5 parts by weight of polyamide 12 of pellet shape having a melt flow rate of 80 g/10 min.
- 0.2 part by weight (0.067 part by weight in terms of copper) of copper iodide.
- 0.2 part by weight of potassium iodide (I/Cu molar ratio=2.15).
- 5 parts by weight of carbon black (#45, manufactured by Mitsubishi Chemical Industries, Ltd.) having an average particle diameter of 24 μm and an oil absorption of 53 cc/100 g.

The mixture was melt-kneaded at 275° C. using a vented extruder, and then extruded into strands. The strands were cooled in a water bath, cut and dried to prepare a pellet-shaped molding material. This molding material was injection-molded at a mold temperature of 130° C. to obtain test pieces.

Some of the test pieces were measured for the above-mentioned mechanical properties (1) and color tone (2).

Other test pieces were subjected to an exposure test. The exposure test was conducted by placing a test piece in a sunshine weather meter (model: WEL-SUNHC manufactured by Suga Shikenki K.K.) and subjecting the test piece to light exposure and also to water spraying (12 minutes per hour) while maintaining the black panel temperature at 63° C.

The test pieces after 500-hour or 1,000-hour exposure were measured for the above-mentioned test items (1) to (4). The results are shown in Table 1.

EXAMPLE 2

The procedure of Example 1 was repeated with the exception that the amount of carbon black used was changed to 3 parts by weight. The results are shown in Table 1.

EXAMPLE 3

40 Parts by weight of the same MX nylon as used in Example 1, 5 parts by weight of the same polyamide 66 as used in Example 1, 5 parts by weight of the same polyamide 12 as used in Example 1, 50 parts by weight of glass fiber-chopped strands of 3 mm in length [CS03JAFT2 (trade name) manufactured by Asahi Fiber Glass Co., Ltd], 0.2 part by weight of copper iodide, 0.2 part by weight of potassium iodide, and 5 parts by weight of the same carbon black as used in Example 1 were melt-kneaded, extruded into strands, cooled, cut and dried in the same manner as in Example 1 to obtain a pellet-shaped molding material. The material was measured for weather resistance in the same manner as in Example 1. The results are shown in Table 1.

EXAMPLE 4

The procedure of Example 3 was repeated with the exception that 0.2 part by weight of copper (I) oxide was used in place of copper iodide. The results are shown in Table 1.

EXAMPLE 5

The procedure of Example 3 was repeated with the exception that the amount of the glass fiber-chopped strands used was changed from 50 parts by weight to 30 parts by weight and further 20 parts by weight of a mica powder having an average particle diameter of 90 μm [B-82 (trade name), manufactured by Yamaguchi Mica K.K.] was used. The results are shown in Table 1.

EXAMPLE 6 AND 7

The procedure of Example 3 was repeated with the exception that there was used, as polyamide 12, one having a melt flow rate of 250 g/10 min. (Example 6) or 35 g/10 min (Example 7). The results are shown in Table 1.

COMPARATIVE EXAMPLE 1

The procedure of Example 1 was repeated with the exception that no polyamlde 12 was used. The results are shown in Table 2.

COMPARATIVE EXAMPLE 2

The procedure of Example 1 was repeated with the exception that neither copper iodide nor potassium iodide was used. The results are shown in Table 2.

COMPARATIVE EXAMPLE 3

The procedure of Example 1 was repeated with the exception that no carbon black was used. The results are shown in Table 2.

COMPARATIVE EXAMPLE 4

The procedure of Example 4 was repeated with the exception that no polyamide 12 was used. The results are shown in Table 2.

As is clear from the above Examples and Comparative Examples, the polyamide resin composition of the present invention has excellent weather resistance.

TABLE 1

| Example No. | 1 | 2 | 3 | 4 | 5 | 6 | 7 |
| --- | --- | --- | --- | --- | --- | --- | --- |
| Formulation (wt. parts) | | | | | | | |
| MX nylon | 90 | 90 | 40 | 40 | 40 | 40 | 40 |
| Polyamide 66 | 5 | 5 | 5 | 5 | 5 | 5 | 5 |
| Polyamide 12 | 5 | 5 | 5 | 5 | 5 | 5 | 5 |
| Glass fiber | — | — | 50 | 50 | 30 | 50 | 50 |
| Mica | — | — | — | — | 20 | — | — |
| Copper iodide | 0.2 | 0.2 | 0.2 | — | 0.2 | 0.2 | 0.2 |
| Copper (I) oxide | — | — | — | 0.2 | — | — | — |
| Potassium iodide | 0.2 | 0.2 | 0.2 | 0.2 | 0.2 | 0.2 | 0.2 |

TABLE 1-continued

| Example No. | 1 | 2 | 3 | 4 | 5 | 6 | 7 |
|---|---|---|---|---|---|---|---|
| Carbon black | 5 | 3 | 5 | 5 | 5 | 5 | 5 |
| Cu* | 0.07 | 0.07 | 0.15 | 0.39 | 0.15 | 0.15 | 0.15 |
| I/Cu** | 2.15 | 2.15 | 2.15 | 0.43 | 2.15 | 2.15 | 2.15 |
| *Before exposure* | | | | | | | |
| *Mechanical properties* | | | | | | | |
| Tensile strength (kgf/cm$^2$) | 800 | 850 | 2320 | 2350 | 1800 | 2320 | 2320 |
| Tensile elongation (%) | 2.0 | 2.0 | 1.6 | 1.6 | 1.0 | 1.6 | 1.6 |
| Flexural strength (kgf/cm$^2$) | 1600 | 1650 | 3170 | 3200 | 2400 | 3170 | 3170 |
| Flexural modulus (10$^3$ kgf/cm$^2$) | 45 | 45 | 160 | 160 | 200 | 160 | 160 |
| *Color tone* | | | | | | | |
| L value | 9.79 | 10.02 | 10.42 | 10.48 | 10.12 | 10.42 | 10.42 |
| Color difference ΔE | 0 | 0 | 0 | 0 | 0 | 0 | 0 |
| *After 500-hour exposure* | | | | | | | |
| *Mechanical properties* | | | | | | | |
| Tensile strength (kgf/cm$^2$) | 780 | 820 | 2270 | 2290 | 1780 | 2270 | 2270 |
| Tensile elongation (%) | 1.9 | 1.9 | 1.5 | 1.5 | 1.0 | 1.5 | 1.5 |
| Flexural strength (kgf/cm$^2$) | 1560 | 1600 | 3100 | 3120 | 2350 | 3100 | 3100 |
| Flexural modulus (10$^3$ kgf/cm$^2$) | 44 | 44 | 160 | 160 | 197 | 160 | 160 |
| *Color tone* | | | | | | | |
| L value | 12.20 | 12.72 | 13.99 | 14.01 | 14.10 | 13.80 | 14.90 |
| Color difference, ΔE | 3.14 | 3.30 | 3.86 | 3.88 | 4.00 | 3.50 | 4.80 |
| Occurrence of surface cracks | ○ | ○ | ○ | ○ | ○ | ○ | ○ |
| Surface gloss (visual check) | ○ | ○ | ○ | ○ | ○ | ○ | ○ |
| *After 1,000-hour exposure* | | | | | | | |
| *Mechanical properties* | | | | | | | |
| Tensile strength (kgf/cm$^2$) | 760 | 800 | 2220 | 2230 | 1750 | 2220 | 2220 |
| Tensile elongation (%) | 1.8 | 1.8 | 1.4 | 1.4 | 0.9 | 1.4 | 1.4 |
| Flexural strength (kgf/cm$^2$) | 1520 | 1570 | 3080 | 3100 | 2300 | 3080 | 3080 |
| Flexural modulus (10$^3$ kgf/cm$^2$) | 43 | 43 | 158 | 158 | 195 | 158 | 158 |
| *Color tone* | | | | | | | |
| L value | 14.36 | 14.58 | 15.58 | 15.82 | 16.00 | 15.20 | 17.00 |
| Color difference ΔE | 4.52 | 4.72 | 5.33 | 5.70 | 5.90 | 5.00 | 6.80 |
| Occurrence of surface cracks | ○ | ○ | ○ | ○ | ○ | ○ | ○ |
| Surface gloss (visual check) | ○ | ○ | ○ | ○ | ○ | ○ | ○ |

TABLE 2

| Comparative Example No. | 1 | 2 | 3 | 4 |
|---|---|---|---|---|
| *Formulation (wt. parts)* | | | | |
| MX nylon | 95 | 90 | 90 | 45 |
| Polyamide 66 | 5 | 5 | 5 | 5 |
| Polyamide 12 | — | 5 | 5 | — |
| Glass fiber | — | — | — | 50 |
| Copper iodide | 0.2 | — | 0.2 | — |
| Copper (I) oxide | — | — | — | 0.2 |
| Potassium iodide | 0.2 | — | 0.2 | 0.2 |
| Carbon black | 5 | 5 | — | 5 |
| Cu* | 0.067 | — | 0.067 | 0.36 |
| I/Cu** | 2.15 | — | 2.15 | 0.43 |
| *Before exposure* | | | | |
| *Mechanical properties* | | | | |
| Tensile strength (kgf/cm$^2$) | 850 | 800 | 880 | 2350 |
| Tensile elongation (%) | 2.0 | 2.0 | 2.1 | 1.6 |
| Flexural strength (kgf/cm$^2$) | 1650 | 1600 | 1700 | 3150 |
| Flexural modulus (10$^3$ kgf/cm$^2$) | 46 | 45 | 46 | 160 |
| *Color tone* | | | | |
| L value | 9.85 | 9.82 | — | 10.50 |
| Color difference ΔE | 0 | 0 | — | 0 |
| *After 500-hour exposure* | | | | |
| *Mechanical properties* | | | | |
| Tensile strength (kgf/cm$^2$) | 790 | 730 | 780 | 2250 |
| Tensile elongation (%) | 1.9 | 1.9 | 2.0 | 1.5 |
| Flexural strength (kgf/cm$^2$) | 1570 | 1500 | 1600 | 3100 |
| Flexural modulus (10$^3$ kgf/cm$^2$) | 44 | 44 | 45 | 160 |
| *Color tone* | | | | |
| L value | 18.52 | 19.63 | — | 17.49 |
| Color difference, ΔE | 7.68 | 9.22 | — | 7.59 |
| Occurrence of surface cracks | ○ | X | X | ○ |
| Surface gloss (visual check) | △ | △ | △ | △ |
| *After 1,000-hour exposure* | | | | |
| *Mechanical properties* | | | | |
| Tensile strength (kgf/cm$^2$) | 700 | 680 | 740 | 2170 |
| Tensile elongation (%) | 1.7 | 1.7 | 1.7 | 1.4 |
| Flexural strength (kgf/cm$^2$) | 1500 | 1450 | 1500 | 1960 |
| Flexural modulus (10$^3$ kgf/cm$^2$) | 42 | 42 | 42 | 157 |
| *Color tone* | | | | |
| L value | 21.56 | 21.07 | — | 20.07 |
| Color difference ΔE | 10.22 | 10.03 | — | 9.71 |
| Occurrence of surface cracks | X | X | X | X |
| Surface gloss (visual check) | X | X | X | X |

(Note)
In the above Tables 1 and 2, the symbols "*" and "**" are defined as follows:
*: Proportion of copper of copper iodide or copper (I) oxide per 100 parts by weight of the total of MX nylon and polyamide 66.
**: The number of iode atoms per one copper atom of the copper compound.

What is claimed is:

1. A polyamide resin composition comprising
   (A) a resin component of a polyamide (a) containing a xylylenediamine component in an amount of 60% by weight or more based on total diamine components and an α,ω-straight chain aliphatic dibasic acid component in an amount of 70% by weight or more based on total amount of dibasic acid components, or a combination of the polyamide (a) and polyamide 66,
   (B) polyamide 12 in an amount of 1 to 15 parts by weight per 100 parts by weight of the resin component (A),
   (C) a copper (I) oxide or a copper (II) oxide compound in an amount of 0.01 to 5 parts by weight, in terms of copper, per 100 parts by weight of the resin component (A),
   (D) carbon black in an amount of 1 to 15 parts by weight per 100 parts by weight of the resin component (A), and
   (E) an alkali metal halide of such an amount that the number of halogen atoms of the alkali metal halide is 0.3 to 4 per one copper atom of the above copper compound.

2. The polyamide resin composition according to claim 1, wherein the combination of the polyamide (a) and polyamide 66 contains polyamide 66 in an amount of 40% by weight or less.

3. The polyamide resin composition according to claim 1, which further comprises 30 to 140 parts by weight of a reinforcing fiber material per 100 parts by weight of the polyamide (a) or the combination of the polyamide (a) and polyamide 66.

4. The polyamide resin composition according to claim 1, which further comprises 20 to 80 parts by weight of mica per 100 parts by weight of the polyamide (a) or the combination of the polyamide (a) and polyamide 66.

5. The polyamide resin composition according to claim 1, wherein the polyamide 12 has a melt flow rate of 20 to 250 g/10 min. as measured by ASTM D 1238 under the conditions of the load of 10 kg at a temperature of 275° C.

6. The polyamide resin composition according to claim 1, wherein the alkali metal halide is potassium iodide.

7. The polyamide resin composition according to claim 1, wherein the $\alpha,\omega$-straight chain aliphatic dibasic acid component has 6 to 12 carbon atoms.

8. The polyamide resin composition according to claim 1, which is suitable for injection molding.

9. An article obtained by injection-molding the polyamide resin composition of claim 1.

10. The polyamide resin composition according to claim 1, wherein the polyamide (a) consist essentially of the xylylenediamine component and the $\alpha,\omega$-straight chain aliphatic dibasic acid component.

* * * * *